United States Patent

Hashibe et al.

Patent Number: 5,089,345
Date of Patent: Feb. 18, 1992

[54] CRYSTALLIZED GLASS ARTICLE HAVING AN IRREGULAR ROUGH SURFACE PATTERN AND A METHOD FOR PRODUCING THE SAME

[75] Inventors: Yoshio Hashibe; Takahiro Matano; Takehiro Shibuya, all of Shiga; Takashi Sakane, Kusatsu; Yasuhiro Baba, Hikone; Masanori Moritake, Nagashama, all of Japan

[73] Assignee: Nippon Electric Glass Co., Ltd., Shiga, Japan

[21] Appl. No.: 430,632

[22] Filed: Nov. 1, 1989

[30] Foreign Application Priority Data

Nov. 2, 1988 [JP] Japan .................. 63-278458

[51] Int. Cl.$^5$ ............................ B32B 17/06
[52] U.S. Cl. .................... 428/428; 428/15; 428/212; 428/426; 428/325; 428/701; 428/702; 501/5; 501/11; 501/55
[58] Field of Search ............ 501/5, 11, 55; 428/325, 428/428, 212, 702, 701, 426, 15; 65/33, 18.1

[56] References Cited

U.S. PATENT DOCUMENTS

| | | | |
|---|---|---|---|
| 2,977,264 | 3/1961 | Shapiro et al. | 428/325 |
| 3,929,497 | 12/1975 | Clark-Monks | 501/5 |
| 3,955,989 | 5/1976 | Nakamura | 501/5 |
| 4,045,435 | 10/1977 | Sakane et al. | 65/33 |
| 4,464,475 | 8/1984 | Beall | 428/325 |
| 4,519,828 | 5/1985 | Beall | 501/5 |
| 4,526,873 | 7/1985 | Beall | 501/5 |
| 4,883,705 | 11/1989 | Kawakami | 428/428 |
| 4,887,404 | 12/1989 | Saji | 428/428 |
| 4,957,785 | 9/1970 | Fornadley | 428/15 |
| 4,978,376 | 12/1990 | Takahashi et al. | 65/33 |

FOREIGN PATENT DOCUMENTS 0039884 10/1978 Japan ................ 501/5

Primary Examiner—Ellis P. Robinson
Assistant Examiner—Archene Turner
Attorney, Agent, or Firm—Collard, Roe & Galgano

[57] ABSTRACT

In a crystallized glass article consisting of crystallized glass masses fusion bonded together and having a principal surface, said principal surface having a surface pattern determined by said masses in a surface layer including said principal surface, said small crystallized glass masses in said surface layer are mainly of flaky crystallized glass pieces, each being a relatively large flattened piece, said flaky pieces overlapping one another at random to make said principal surface rough, said crystallized glass masses in another layer adjacent to and fused to said surface layer being considerably smaller than said flaky pieces. The article is produced by preparing flaky pieces and the smaller masses both of a $SiO_2$—$Al_2O_3$—$CaO$ crystallizable glass, putting the former pieces on a bottom of a mold to form a flaky-piece layer, then putting the latter masses on the flaky-piece layer to form a small-mass layer, and heat treating the both layers at a temperature higher than a softening point of the crystallizable glass to fusion bond the pieces and masses together as well as crystallizing the glass.

3 Claims, 1 Drawing Sheet

CRYSTALLIZED GLASS ARTICLE HAVING AN IRREGULAR ROUGH SURFACE PATTERN AND A METHOD FOR PRODUCING THE SAME

BACKGROUND OF THE INVENTION

1. Field of the Invention

The present invention relates to crystallized glass articles having surface patterns imparting to them an appearance of natural stone or stones which are adaptable for use as heat resistant, incombustible ornamental wall materials for buildings and the like, in particular, to such crystallized glass articles having an uneven or non-flat surface.

2. Description of the Prior Art

As substitution of natural marble for ornamental building materials, crystallized glass articles have been proposed which have high mechanical strength, excellent heat resistance and excellent efflorescence resistance. For example, U.S. Pat. Nos. 3,761,235 3,964,917 and 3,955,989, Japanese Patent Publication (JP,B2) No. 60-49145, JPA 63-40736 and others.

Those crystallized glass articles are commonly produced with a flat surface. It is possible by use of a mold having an uneven, rugged or rough pattern in the mold surface to provide an uneven surface pattern to those article. However, an uneven surface pattern is only possible by use of such a mold. For various uneven surface patterns, a large number of molds must be provided, which is uneconomical.

SUMMARY OF THE INVENTION

It is an object of the present invention to provide a crystallized glass article having an irregular rough surface pattern such as a scalelike or squamous form which is readily produced.

It is another object of the present invention to provide a method for producing such a crystallized glass article with an irregular rough surface pattern.

The present invention is directed to a crystallized glass article consisting of crystallized glass masses fusion bonded together and having a principal surface, said principal surface having a surface pattern determined by said masses in a surface layer including said principal surface. According to the present invention, the small crystallized glass masses in said surface layer are mainly of flaky crystallized glass pieces, each being a relatively large flattened piece, said flaky pieces overlapping one another at random to make said principal surface rough, said crystallized glass masses in another layer adjacent to and fusion-bonded to said surface layer being considerably smaller than said flaky pieces.

According to the present invention a method for producing a crystallized glass article is also provided which comprises steps of: preparing relatively large flattened and flaky pieces of a first crystallizable glass which is softened and deformed by heat treatment at a temperature higher than its first softening point and small masses considerably smaller than said flaky pieces and of a second glass which is softened and deformed by heat treatment at a temperature higher than its second softening point; putting said flaky pieces into a mold having an internal surface coated with a mold release agent to form a flaky-piece layer in which said flaky pieces overlap one another at random on a bottom of the mold; putting said small masses onto said flaky-piece layer to form a small-mass layer; and heat-treating said flaky-piece layer and said small-mass layer at a temperature higher than said first and second softening points to fusion bond said flaky pieces and small masses to one another together with crystallization of said flaky pieces and small masses to form said crystallized glass article.

DESCRIPTION OF PREFERRED EMBODIMENTS

In production of the crystallized glass article of the present invention, a relatively large flaky or flattened pieces of a crystallizable glass are prepared by, for example, breaking or crushing a crystallizable glass plate which is made by a conventional glass plate producing method. The glass plate has a thickness of 0.1–5 mm, and each of said flaky pieces has an area of 0.1–100 cm$^2$.

On the other hand, a relatively small masses or balls of a crystallizable glass are prepared by, for example, coarsely grinding a crystallized glass or water-granulating a melt of a crystallizable glass. Each of said small balls has a diameter of 10 mm or less.

The crystallizable or crystallized glass used here consists essentially of $SiO_2$ of 50–65%, $Al_2O_3$ of 3–13% CaO of 15–25% and ZnO 2–10% on the base of weight percent.

Figure 1:
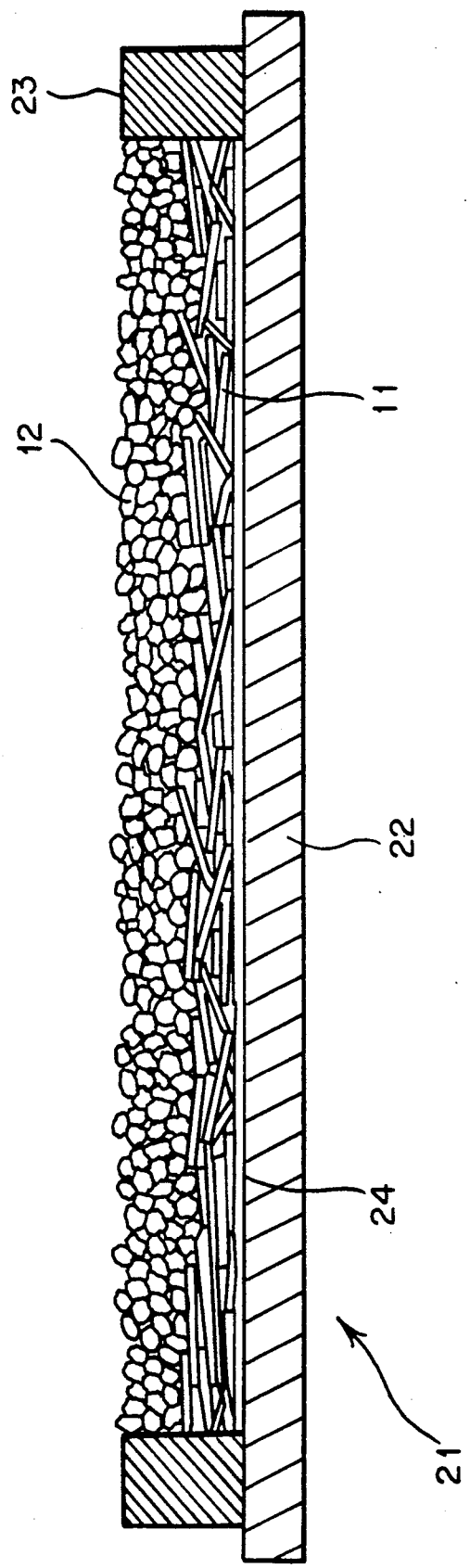
FIG. 1 is a sectional view illustrating a step in production of the crystallized glass with the irregular rough surface pattern.

Referring to FIG. 1, the flaky pieces 11 are put into a mold 21 to form a flaky-piece layer in which flaky pieces overlap at random.

The mold 21 comprises a refractory bottom plate 22, a refractory frame 23 mounted on the bottom plate 22 and an alumina or zirconia sheet 24 as a mold release agent coated on the bottom plate 22.

Then, the small masses or balls 12 are put on the flaky-piece layer to form a small-mass layer.

Then, the flaky-piece layer and the small-mass layer are heat-treated at a temperature of 1,000°–1,200° C. which is higher than the softening point of the crystallizable or crystallized glass, so that each of the crystallizable glass pieces and balls is crystallized as well as softened and deformed to fusion-bond to one another to form an article.

Figure 2:
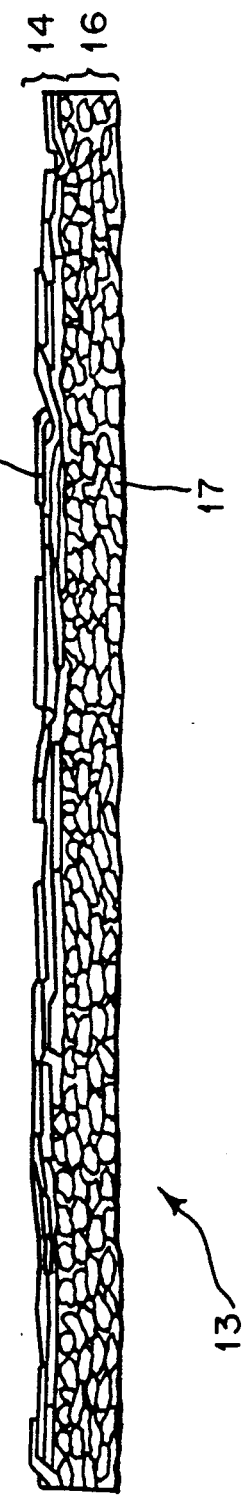
FIG. 2 is a sectional view of the crystallized glass article.

Referring to FIG. 2, the produced crystallized glass article 13 comprises a surface layer 14 which are mainly composed of flaky crystallized glass pieces 15 which overlap one another at random and fusion-bonded to one another. The principal surface has an irregular rough surface pattern such as the scalelike or squamous pattern. Another layer 15 adjacent to said surface layer 14 is composed of small masses of the crystallized glass which are fusion-bonded together and to the surface layer 14.

In the crystallized glass article of the present invention, the small masses such as balls or coarsely ground masses are used together with the flaky pieces so as to form a densified or non-porous layer in the resultant crystallized glass plate. Non-use of the small masses makes the resultant crystallized glass porous including channels extending from the principal surface to the opposite surface thereof.

EXAMPLE 1

A glass batch was prepared which comprises $SiO_2$ of 59.0%, $Al_2O_3$ of 6.8%, CaO of 19.1%, ZnO of 6.8%, $K_2O$ of 1.7%, $Na_2O$ of 1.7%, $B_2O_3$ of 0.6%, and BaO of 4.3% to form a crystallized glass having a softening point of 820° C. The glass batch was melted at a temperature of about 1,450° C. from which a glass plate was produced with a thickness of 1.0 mm by a conventional rolling method. The glass plate was crushed to obtain flattened or flaky pieces each having a surface area of about 1–10 $cm^2$.

On the other hand, the glass melt was poured into water to form small crystallizable glass balls each having a diameter of about 10 mm by water granulation.

The flaky pieces and the balls were put into the refractory mold as described above with a volumetric ratio of 3:7. Thereafter, the heat treatment was performed at about 1,100° C. in a furnace for about one hour to fusion-bond the flaky pieces and the balls together with one another and to simultaneously crystallize the flaky pieces and balls. The crystals are $\beta$-wollastonite. After cooled in the furnace to room temperature, a resultant crystallized plate was taken out from the mold. The crystallized glass plate had a principal surface with an uneven, rough or scalelike pattern due to the flaky pieces to present a delustered and elegant appearance.

EXAMPLE 2

A crystallized glass was prepared from the glass batch described in Example 1. The crystallized glass was crushed and coarsely ground to form small crystallized glass masses each having a size considerably smaller than the flaky piece. The crystallized glass masses were mixed with crystallizable glass balls as described in Example 1 to form small masses. The flaky pieces as described in Example 1 and the small masses were put into the refractory mold with a volumetric ratio of 3:7. Then, the heat treatment was carried out in the similar manner as described in Example 1. A resultant crystallized glass plate had an irregular rough surface pattern in the principal surface which provided the delustered and elegant appearance.

What is claimed is:

1. In a crystallized glass article having an irregular rough surface pattern consisting of crystallized glass masses fusion bonded together and having a principal surface, said principal surface having a surface pattern determined by said masses in a surface layer including said principal surface, the improvement wherein said surface layer is substantially made of flaky and flattened pieces of a first crystallized glass as said crystallized glass masses, said flaky and flattened pieces overlapping one another at random, another layer adjacent to and fused to said surface layer being made of small pieces of a second crystallized glass as said crystallized glass masses, said small pieces being smaller than said flaky and flattened pieces.

2. A crystallized glass article as claimed in claim 1, wherein said first crystallized glass consists essentially of $SiO_2$ of 50–65%, $Al_2O_3$ of 3–13% CaO of 15–25% and ZnO 2–10% based on the percentage by weight.

3. A crystallized glass article as claimed in claim 2, wherein said second crystallized glass consists essentially of $SiO_2$ of 50–65%, $Al_2O_3$ of 3–13% CaO of 15–25% and ZnO 2–10% based on the percentage by.

* * * * *